United States Patent
Yamada et al.

[11] Patent Number: 5,744,103
[45] Date of Patent: Apr. 28, 1998

[54] HYDROCARBON ADSORBENT FOR EXHAUST GAS CLEANING, EXHAUST GAS CLEANING CATALYST AND EXHAUST GAS CLEANING DEVICE

[75] Inventors: Hiroshi Yamada, Hatsukaichi; Toshitsugu Ueoka; Akihide Takami, both of Hiroshima; Naoko Sakatani, Hiroshima-ken, all of Japan

[73] Assignee: Mazda Motor Corporation, Hiroshima-ken, Japan

[21] Appl. No.: 314,251

[22] Filed: Sep. 29, 1994

[30] Foreign Application Priority Data

Sep. 30, 1993 [JP] Japan ................. 5-245073
Aug. 19, 1994 [JP] Japan ................. 6-195447

[51] Int. Cl.$^6$ ................. B01D 50/00; B01J 29/06
[52] U.S. Cl. ................. 422/171; 422/177; 422/190; 422/211; 422/212; 422/213; 502/67; 502/71; 502/79; 502/407; 585/820
[58] Field of Search ................. 502/407, 67, 71, 502/79; 422/171, 177, 190, 211, 212, 213; 585/820

[56] References Cited

U.S. PATENT DOCUMENTS

| | | | |
|---|---|---|---|
| 4,231,768 | 11/1980 | Siebert et al. | 55/179 |
| 4,537,757 | 8/1985 | Chono et al. | 423/328 |
| 4,610,700 | 9/1986 | Miller et al. | 55/35 |
| 5,179,054 | 1/1993 | Schipper et al. | 502/67 |
| 5,278,114 | 1/1994 | Wielers et al. | 502/67 |
| 5,292,696 | 3/1994 | Ito et al. | 502/66 |
| 5,407,880 | 4/1995 | Ikeda et al. | 502/67 |
| 5,409,671 | 4/1995 | Takemoto et al. | 422/180 |
| 5,410,875 | 5/1995 | Tanaka et al. | 60/288 |
| 5,422,333 | 6/1995 | Kano et al. | 502/60 |

FOREIGN PATENT DOCUMENTS 4-293519 10/1992 Japan.
5-59941 3/1993 Japan.

OTHER PUBLICATIONS

"Atlas of Zeolite Structure Types" by W. M. Meier and D. H. Olson, Published 1978.

*Primary Examiner*—Nina Bhat
*Attorney, Agent, or Firm*—Morrison & Foerster LLP

[57] ABSTRACT

In order to adsorb effectively various kind of hydrocarbons each having a different size 6, a zeolite having a larger pore 8, a zeolite having a smaller pore 6 and a zeolite having an in-between pores 7 are present together very closely located very closely to one another by means of, for example, physically mixing them.

17 Claims, 7 Drawing Sheets

HYDROCARBON ADSORBENT FOR EXHAUST GAS CLEANING, EXHAUST GAS CLEANING CATALYST AND EXHAUST GAS CLEANING DEVICE

BACKGROUND OF THE INVENTION

1. Field of the Invention

The present invention relates to an adsorbent component which adsorbs a hydrocarbon, in particular a low temperature hydrocarbon, contained in an exhaust gas, an exhaust gas cleaning catalyst and an exhaust gas cleaning device.

2. Description of the Related Art

A catalyst member comprising a support on which a noble metal coating is provided is used for cleaning of an exhaust gas from, for example, an automobile internal combustion engine. Among cleaning activities of the catalyst member for harmful components contained in the exhaust gas (such as a hydrocarbon (HC), carbon monoxide (CO) and a nitrogen oxide (NOx)), the cleaning activity for the hydrocarbon is most highly affected by a temperature of the exhaust gas. Generally, the hydrocarbon is cleaned at a temperature not lower than 300° C. with the catalyst comprising a noble metal. Therefore, when a temperature of the exhaust gas is lower as in the case of just after engine start (namely, during so-called cold start mode), the hydrocarbon contained in the exhaust gas is not likely to be cleaned with the noble metal catalyst.

In addition, just after the engine start, a large amount of the hydrocarbon at a low temperature is discharged, of which percentage to a total amount of Hydrocarbon Emission is large. So, it is important to reduce an amount of the low temperature hydrocarbon for the exhaust gas cleaning.

A device as a hydrocarbon adsorbent member which decreases the hydrocarbon during the cold start mode, there is provided a monolithic support coated with a powder mixture of ZSM-5 zeolites which have been ion exchanged with copper (Cu) and palladium (Pd), respectively which modify adsorption characteristics of the zeolites (see Japanese Patent Kokai Publication No. 293519/1992).

The device as described above shows its hydrocarbon adsorption activity over a wide temperature range since it is formed to show various peak adsorption capacities in different temperature ranges due to various suitable metals supported by the zeolites through the ion exchange. However, when various hydrocarbons each having a different molecular size are discharged, it is difficult for the device to fully adsorb all of the hydrocarbons.

The zeolite is used as a useful adsorbent and there are various kinds of the zeolites such as an eight membered ring structure zeolite, ten membered ring structure zeolite and twelve membered ring structure zeolite each having an inherent pore structure such as a pore opening diameter. Thus, the adsorption capacity of the zeolite inconveniently and highly depends on the size of the hydrocarbon molecule (thus, its molecular weight and shape). For example, when the zeolite having a smaller opening diameter of the pore such as the eight membered ring pore or the ten membered ring pore is used, the hydrocarbon having a higher molecular weight (such as a paraffin, an olefin or an aromatic having at least six carbon atoms) cannot be adsorbed. To the contrary, when the zeolite having a larger opening diameter of the pore such as the twelve membered ring pore is used, the hydrocarbon having a lower molecular weight (such as methane) is desorbed at a lower temperature, so that it is difficult to keep such a hydrocarbon until the noble metal becomes of high temperature and activated.

On the other hand, it is also known that a monolithic support carries zeolite Y having larger pores on an upstream portion thereof and ZSM-5 having smaller pores on a downstream portion thereof with respect to a flow direction of an exhaust gas stream (see Japanese Patent Kokai Publication No. 59941/1993). This support is intended to use two kinds of the zeolites having the different pore diameters as the hydrocarbon adsorbents so as to adsorb both of the larger size hydrocarbon and the smaller size hydrocarbon contained in the exhaust gas. Further, the pores of the zeolite of the downstream portion having the smaller pore diameter are not to be plugged by the larger size hydrocarbon since it is adsorbed it with the zeolite of the upstream portion having the larger pore diameter.

However, a temperature difference between the upstream portion and the downstream portion of the monolithic support is generally about 100° C. When zeolite Y and ZSM-5 are located at the upstream side and the downstream side of the support separately, ZSM-5 downstream would be of a temperature of about 100° C. when zeolite Y upstream is of a temperature of about 200° C. A temperature at which zeolite Y desorbs the large size hydrocarbon having carbon atoms at least six is about 200° C., and a temperature at which ZSM-5 desorbs the smaller size hydrocarbon having carbon atoms less than six is in a range of about 100° to 150° C. Therefore, when a temperature of the upstream portion of the monolithic support is heated to about 200° C., no additional adsorption of the hydrocarbons by the monolithic support occurs and the hydrocarbons which has been already adsorbed would be desorbed.

In the above support, even though the hydrocarbon is of a smaller size, it would be once adsorbed by zeolite Y upstream having the larger pores. Namely, zeolite Y adsorbs not only the large size hydrocarbon but also the small size one, so that its adsorption capacity is decreased due to the adsorbed small size hydrocarbon. As a result, a portion of the larger size hydrocarbon flows to the downstream side so that pores of ZSM-5 are plugged with the hydrocarbon, resulting in the decrease of the adsorption capacity for the smaller size hydrocarbon.

An activated carbon is well known as a material which has a large hydrocarbon adsorption capacity. However, since it is less heat resistant, it cannot be used for the exhaust gas cleaning.

SUMMARY OF THE INVENTION

It is, therefore, an object of the present invention to provide an adsorbent for a hydrocarbon which overcomes the above problems.

In addition, it is another object of the present invention to effectively clean an exhaust gas by means of such an absorbent, and also to effectively utilize an adsorbed hydrocarbon so as to clean NOx in an exhaust gas.

The inventors have made extensive studies as to a zeolite having pores of a larger diameter and a zeolite having pores of a smaller diameter for exhaust gas cleaning and found that the above problems are overcome by both zeolites located very closely to one another by means of, for example, physically mixing them and laminating them adjacently.

DETAILED DESCRIPTION OF THE INVENTION

In the first aspect, the present invention provides an adsorbent component for the adsorption of a hydrocarbon contained in an exhaust gas in which at least two kinds of metal containing crystalline silicates (in the form of powder) are mixed each of which has a different pore diameter to one another.

According to the present invention, even when the adsorbent component is carried by a monolithic support member, the absorbent component, that is said at least two kinds of the metal containing crystalline silicates each having the different pore diameter to one another, can be uniformly distributed throughout the supporting member from its upstream end to its downstream end with respect to, for example, a flow direction of an exhausted gas in the case in which it is installed in a exhaust gas line from an engine. Even though an upstream portion of the monolithic support is of a temperature of about 200° C., a downstream portion at a lower temperature of the support can still adsorb the hydrocarbon and it can keep its adsorption capacity of the hydrocarbon until it is of a relatively higher temperature.

In addition, since at least two kinds of the metal containing silicates each having the different pore diameter are so mixed that the silicates are present together very closely to one another (one silicate is located within a vicinity of the other silicate), there seldom occurs a case in which both of a large size hydrocarbon and a small size hydrocarbon are trapped together by a crystalline silicate having larger pores, which has been observed in the prior art. A possibility is increased that a hydrocarbon is selectively trapped by the metal containing silicate which has pores suitable for the adsorption of the hydrocarbon.

In the present invention, the metal containing silicate may be an aluminosilicate (zeolite) in which Al forms a framework structure of a crystal (crystalline lattice) or other metal containing silicate in which, in addition to or instead of Al, other metal such as Ga, Ce, Mn, Tb and so on forms the framework structure of the crystal.

The metal containing silicates having various pore diameters are listed in Table 1 below:

TABLE 1

| Structure Type | | Pore Diameter (nm) | $SiO_2/Al_2O_3$ Ratio |
|---|---|---|---|
| 8 membered ring | CHA etc. | 0.3–0.5 | 4–100 |
| 10 membered ring | MFI, MEL, FER etc. | 0.4–0.6 | 30–200 |
| 12 membered ring | FAU, AFY, β etc. | 0.6–0.75 | 5–100 |

As the metal containing silicate of the twelve membered ring structure type, one having a framework density (T/nm$^3$) [total atom number of Al and Si per unit volume] in a range of 12 to 16 is preferable.

In one embodiment of the absorbent component according to the present invention, said at least two kinds of the metal containing silicates in the form of powder are the ten membered ring structure type silicate and the twelve membered ring structure type silicate, which effectively achieve the effect of the adsorbent component of the first aspect. In this embodiment, the ten membered ring structure type metal containing silicate has a smaller pore diameter and the twelve membered ring structure type metal containing silicate has a larger pore diameter. A weight ratio of the ten membered ring structure type silicate to the twelve membered ring structure type silicate (10 membered ring structure type silicate/12 membered ring structure type silicate) is preferably in a range of 0.4 to 2.6, which makes possible to surely adsorb both of the large size hydrocarbon and the small size hydrocarbon. This adsorbent component is preferably used to adsorb hydrocarbons contained in an exhaust gas from an automobile engine.

When the ratio is not greater than 0.4 (an amount of the ten membered ring structure silicate is relatively decreased), an amount of the adsorbed smaller size hydrocarbon (such as $C_2$–$C_5$ olefins) is decreased, so that a predetermined effect of the present invention cannot be achieved. On the other hand, when the ratio is greater than 2.6 (the twelve membered ring structure silicate is relatively decreased), an amount of the adsorbed larger size hydrocarbon (such as aromatics and other $C_5+$ hydrocarbon) is decreased, so that a predetermined effect of the present invention cannot be achieved. The effect of the present invention will be explained in Examples which will be described below.

In a second aspect, the present invention provides an absorbent component in the form of powder for the absorption of a hydrocarbon in which at least two metal containing crystalline silicate portions each having a different pore diameter to one another are present together in one particle which constitutes the powder.

In this absorbent component, since the at least two metal containing crystalline silicate portions each having the different pore diameter are present together in one (fine) particle, the effect of the first aspect of the present invention becomes more remarkable and the hydrocarbon is readily to be adsorbed. That is, in the case in which the at least two metal containing crystalline silicates in the powder of form are merely mixed so that each silicate particle is independently present as in the first aspect, even when a small size hydrocarbon contacts with and enters the metal containing silicate having the larger pore, it relatively often pass through the pore of the silicate. However, in the adsorbent component of the second aspect, even when the small size hydrocarbon contacts with the metal containing crystalline silicate portion having the larger pore, it would meet with the metal containing silicate portion having the smaller pore after it passes through the larger pore, whereby the smaller size hydrocarbon is trapped by the smaller pore.

In the third aspect, the present invention provides an adsorbent component in the form of powder consisting essentially of a layered silicate particle for the absorption of a hydrocarbon in which at least two metal containing crystalline silicate layers each having a different pore diameter are so laminated that an outer silicate layer as a larger pore diameter than that of a silicate layer on an inner layer in the particle. Thus, an inner layer of the silicate particle has the smaller pore diameter than the pore diameter of an outer layer which is outwardly adjacent to the inner layer. In this embodiment, since a plurality kinds of the metal containing crystalline silicate layers are present in one (fine) particle which constitutes the powder, the same effect as in the second aspect just explained above is also achieved. In addition, since the pore diameter is successively increased from a center layer portion to the outer layer portion, the small size hydrocarbon is trapped in the inner layer portion of the particle as long as the pores of the outer layer portion are not plugged by the larger size hydrocarbon.

Namely, if the outer surface region of the particle has the smaller pore diameter, the pore is plugged even when the smaller size hydrocarbon is adsorbed therein, whereby any further transfer of the hydrocarbon due to its diffusion toward the center of the particle is suppressed, which means that the inner portion of the particle does not effectively function as the absorbent for the hydrocarbon. To the contrary, the absorbent particle in this aspect, the outer surface portion has the larger pore diameter so that the smaller size hydrocarbon is readily to diffuse into the inside of the particle and diffusion of other hydrocarbon is not interrupted.

In addition, when the pore of the outer surface region is plugged by the large pore size hydrocarbon, such hydrocarbon functions as a cap (or a plug) to prevent the smaller size hydrocarbon from desorption from the pore, namely, going out of the pore. Thus, even when a temperature of an atmosphere surrounding the absorbent component is increased, a state that the hydrocarbon is being adsorbed is still kept, which results in the higher desorption temperature of the hydrocarbon.

In the absorbent component of any of the above aspects of the present invention, three kinds of the pore sizes (diameters) may be preferably used: The first silicate pore size is based on an eight membered ring structure, the second silicate pore size is based on a ten membered ring structure, and the third silicate pore size is based on a twelve membered ring structure. These three different pore sizes may be provided by a plurality of the metal containing silicates (zeolites) or a single metal containing silicate having various crystalline portions. When three kinds of the pores are used each having the different pore diameter to one another as in this case, hydrocarbons each having a various size which is contained in the exhaust gas can be effectively adsorbed.

In the fourth aspect, the present invention provides an exhaust gas cleaning device comprising an adsorbent member which adsorbs a hydrocarbon contained in an exhaust gas characterized in that the absorbent member comprises a support member which carries, on its surface, a coating of an absorbent component and the component is a mixture of a plurality of powder zeolites each having a different pore diameter to one another.

The present exhaust gas cleaning device uses, as the absorbent component, the absorbent component which is described in the first aspect. Since, a plurality of the zeolite powders each having the different pore diameter to one another are present on a surface region of the adsorbent member (thus, a surface of the support member) in the device, each of the hydrocarbons having the different size (thus, different molecular weight) is adsorbed by a zeolite which has a suitable pore size for the hydrocarbon, and thus, a similar effect as in the first aspect of the present invention is obtained.

In the fifth aspect, the present invention provides an exhaust gas cleaning device comprising an adsorbent member which adsorbs a hydrocarbon contained in an exhaust gas characterized in that the adsorbent member comprises a support member on which a plurality of zeolites each having a different pore diameter to one another are so coated that the zeolite having the smaller pore diameter is located on an inner side of the zeolite having the larger pore diameter. Also, in this device, a plurality of the zeolites each having the different pore diameter are so located that one zeolite is present very closely to other various zeolites, which provides the same effect as in the adsorbent component of the first aspect. However, this exhaust gas cleaning device is different from layered silicate particle powder of the third aspect of the present invention in that the plurality of the zeolite each having the different pore diameter to one another are coated substantially in a multi layer structure in the fifth aspect.

Namely, the exhaust gas adsorbent component of the third aspect, once the pore of an outermost surface region of the adsorbent particle is plugged by a larger hydrocarbon, no further adsorption is almost possible since the larger hydrocarbon prevents any other carbon from getting into the pore due to its capping function. To the contrary, the exhaust gas cleaning device of the fifth aspect, even when the pore of an outermost surface region of the device adsorbs a large size hydrocarbon, other hydrocarbon can diffuse into the inside of the layered structure through a gap between the particles constituting the surface region and it is adsorbed there by the metal containing silicate of the inner layer.

In the exhaust gas cleaning device, since the smaller hydrocarbon more easily diffuses through the pores of the zeolites and reaches the inner layer than the larger hydrocarbon, the zeolite having the smaller pore is located in an inner side of the zeolite having the larger pore.

In the sixth aspect, the present invention provides an exhaust gas cleaning device comprising an adsorbent member which adsorbs a hydrocarbon contained in an exhaust gas characterized in that the absorbent member comprises a support member on which zeolite particle powder is coated and a particle of the powder comprises a plurality of crystalline zeolite portions each having a different pore diameter to one another. Since this exhaust gas cleaning device uses the adsorbent component of the second aspect of the present invention, the same effect as in the second aspect is achieved.

In the seventh aspect, the present invention provides an exhaust gas cleaning device comprising an adsorbent member which adsorbs a hydrocarbon contained in an exhaust gas characterized in that the absorbent member comprises a support member on which crystalline zeolite particle powder is coated, each particle of the powder contains a plurality of the crystalline portions each having a different pore diameter to one another and the portions are so coated to form a layered structure that a crystalline portion having a larger pore is located in an outer side of a crystalline portion having a smaller pore.

This exhaust gas cleaning device uses the adsorbent component of the third aspect, and thus the same effect as in the third aspect is achieved.

In each of the exhaust gas cleaning device of the fourth to the seventh aspects, three kinds of the pore sizes (diameters) may be preferably used: The first pore size is based on the eight membered ring structure, the second pore size is based on the ten membered ring structure, and the third pore size is based on the twelve membered ring structure. These three different pore sizes may be provided by a plurality of the metal containing silicates (zeolites) or a single metal containing silicate having the various crystalline portions. When these three kinds of the pores are used each being the different pore diameter to one another, hydrocarbons having various size which is contained in the exhaust gas can be effectively adsorbed.

In each of the exhaust gas cleaning device of the fourth to the seventh aspects, the support member may carry ceria and/or Pd (palladium) in addition to the plurality of the zeolites, especially, the zeolites having the three different pore sizes just described above.

Pd is a metal catalyst component which decomposes the hydrocarbon at a relatively lower temperature contained in the exhaust gas, and ceria provides an $O_2$ storage effect. Thus, the hydrocarbon adsorbed by the zeolite of the adsorbent member is decomposed by Pd and ceria even though an $O_2$ concentration in the exhaust gas is changed, so that the hydrocarbon is prevented from being desorbed from the zeolite and discharged without being cleaned upon temperature increase of the exhaust gas.

In the eighth aspect, the present invention provides an adsorbent component in the form of a layered silicate particle powder for the absorption of a hydrocarbon contained in an exhaust gas in which at least two metal containing crystalline silicate portions are so laminated that an outer portion has a smaller pore diameter than in an inner portion with respect to a direction from a center toward an outer surface of a particle which constitutes the powder. This adsorbent component is contrast to the adsorbent component of the third aspect of the present invention. Thus, when the smaller pore in the surface region of the particle is plugged by the hydrocarbon, such plugging is so tight since the pore is small. Therefore, hydrocarbons which have been already adsorbed in a further inside of the pore cannot be desorbed and diffuse toward the outside of the pore because of the plugging. Thereby, the hydrocarbon is still in a trapped state in the pore even though a temperature around the adsorbent is increased, which results that a temperature is increased at which the metal containing silicate releases the hydrocarbon.

In the adsorbent component of the eighth aspect, the layered silicate particle preferably comprises a crystal portion of a ten membered ring structure in its surface region and a crystal portion of a twelve membered ring structure in its inside region to achieve that the outer portion has the smaller pore diameter than that of the inside pore in order to provide the effect of the eighth aspect. In the adsorbent component, the crystal portion having the ten membered ring structure is preferably of MFI type and the crystal portion having the twelve membered ring structure is preferably of FAU type.

The crystal portion of the MFI type is a metal containing silicate exemplified by ZSM-5. The crystal portion of the FAU type is a metal containing silicate exemplified by zeolite Y. Combination of the MFI type and the FAU type is more preferable for the adsorbent component of the eighth aspect.

In the ninth aspect, the present invention provides an exhaust gas cleaning catalyst comprising the adsorbent component of the eighth aspect which carries a catalytic metal which decomposes the hydrocarbon.

With the exhaust gas cleaning catalyst according to the present invention, the hydrocarbon adsorbed within the adsorbent component can be decomposed by the catalytic metal. The desorption temperature of the adsorbent component at which the adsorbed hydrocarbon is desorbed is high, which is very advantageous for the effective cleaning of the hydrocarbon since an amount of the hydrocarbon which is desorbed from the adsorbent component is reduced and such a hydrocarbon can be decomposed with the catalytic metal within the pore. Namely, the decomposition of the hydrocarbon occurs also within the pores of the adsorbent component although the conventional decomposition of the hydrocarbon with zeolite mainly occurs at a surface of the zeolite particle.

In the cleaning catalyst according to the present invention, it is preferable that the catalytic metal decomposes not only the hydrocarbon but also NOx contained in the exhaust gas. Generally, a NOx catalyst which decomposes NOx has a relatively high active temperature at which it shows a NOx decomposition activity. Since the hydrocarbon desorption temperature of the adsorbent component of the present invention is relatively high, NOx is effectively decomposed with utilizing the hydrocarbon trapped by the adsorbent even though the active temperature of the catalyst is high.

A non-limiting example of the catalytic metal is a noble metal such as Pt, Ir and Rh, other transition metal rather than the noble metal or a main group element such as an alkaline earth metal.

Effects of the Invention

In the first aspect, the adsorbent component is formed by mixing at least two metal containing silicate powders together so that various silicates each having the different pore diameter are present very closely to one another, whereby the various hydrocarbons are selectively adsorbed in the various pores suitable for the hydrocarbons to provide the effective adsorption. In addition, when the adsorbent component is carried on the monolithic support, the downstream portion of the support member can be effectively used for the adsorption of the hydrocarbons even when the upstream portion of the support member is of a high temperature and cannot adsorb hydrocarbon any more. Therefore, the adsorbent component can effectively adsorb and keep the hydrocarbons contained in the exhaust gas produced from the engine during the cold start mode.

Further, when the component comprises the metal containing silicate powder having the ten membered ring structure and the metal containing silicate powder having the twelve membered ring structure, the above effect is more effectively achieved. When the weight ratio of (silicate powder of ten membered ring structure)/(silicate powder having the twelve membered ring structure) is within a range of 0.4 to 2.6, both of the small size hydrocarbons and the large size hydrocarbons are surely adsorbed.

In the second and the sixth aspects, since various crystalline portions each having the different pore diameter are present together in one metal containing silicate particle, the same effect as in the first aspect is remarkably achieved and the hydrogen adsorption is accelerated.

In the third and the seventh aspects, since the various silicate layers in the particle each having the different pore diameter are so laminated to be a layered structure that the silicate layer having the larger pore diameter is present on an outer side of the silicate layer having the smaller pore diameter along a direction from the center to the periphery of the particle, not only both of the large and the small hydrocarbons are adsorbed but also the desorption temperature of the adsorbed hydrocarbons is increased, which is advantageous for the adsorption of the hydrocarbon contained in the exhaust gas which is likely to be of a high temperature.

When the pores of the silicates (or the silicate layers or the silicate portions) of the adsorbent component are of the eight membered ring structure, the ten membered ring structure and the twelve membered ring structure, the component is advantage for the adsorption even though the exhaust gas contains the various kinds of the hydrocarbons.

In the fourth aspect, the adsorbent member comprises the support member on which the mixture produced by mixing the various zeolite powders each having the different pore diameter is coated. Thus, since the various zeolite powders each having the different pore diameter are uniformly distributed from the upstream end to the downstream end of the support, most of the hydrocarbon contained in the exhaust gas are effectively adsorbed during the cold start mode.

In the fifth aspect, the adsorbent member comprises the support member on which the various zeolite powders each having the different pore diameter are deposited in such a manner that the zeolite powder having the smallest pore diameter is firstly coated on the support member to have a first coating, then the zeolite powder having the second smallest diameter is coated on the first coating to have a second coating, then the zeolite having the third smallest pore diameter is coated on the second coating to have a third coating and finally the zeolite having the largest pore diameter is coated. Thus, the outer zeolite layer does not interfere with the adsorption of the inner zeolite layer, namely the hydrocarbons can be adsorbed throughout the coated layers from the inner layer to the outer layer.

When the pores of the silicates of the adsorbent component for the exhaust gas cleaning device are of the eight membered ring structure, the ten membered ring structure and the twelve membered ring structure, the component is advantage for the hydrocarbon adsorption even though the exhaust gas contains the various kinds of the hydrocarbons. In addition, when ceria and/or Pd in combination with the zeolite are carried by the support member, the hydrocarbon adsorbed by the adsorbent member can be decomposed and discharged.

In the eighth aspect, since the adsorbent component comprises the layered crystalline metal containing layered silicate particle in which the zeolite layer having the smaller pore is located on an outer side of the zeolite layer having the larger pore, it can keep the adsorbed hydrocarbons trapped until the temperature of the component is elevated, so that it is effective to prevent the premature desorption of the adsorbed hydrocarbons. In this component, when the surface region of the metal-containing silicate particle is made of the zeolite having the ten membered ring structure and the inside thereof is made of the twelve membered ring structure, the desorption temperature of the hydrocarbons are surely increased. Further, when the zeolite having the ten membered ring structure is of the MFI type and the zeolite having the twelve membered ring structure is of the FAU type, the desorption temperature of the hydrocarbons are more surely increased. In addition, when the catalytic metal is also supported by the adsorbent component of which hydrocarbon desorption temperature is high, the amount of the hydrocarbon which are discharged without decomposition is decreased, so that the hydrocarbon is effectively cleaned with the decomposition thereof within the pores of the particles. When the catalytic metal is the NOx catalytic metal which decomposes NOx while decomposes the hydrocarbons, the hydrocarbons adsorbed by the adsorbent component are utilized for the effective decomposition of NOx even when the active temperature of the catalytic metal is high.

EXAMPLES

The present invention will be, hereinafter, described with reference to the following Examples.

Figure 1:
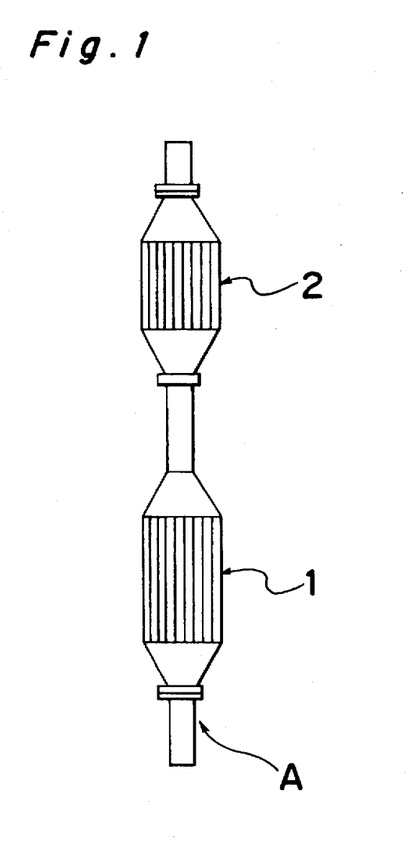
FIG. 1 schematically shows one embodiment of an exhaust gas cleaning equipment according to the present invention.

FIG. 1 schematically shows one embodiment of an exhaust gas cleaning device according to the present invention, which can be installed in an exhaust gas line (A) from an engine of an automobile. The exhaust gas line comprises an adsorption device 1 which contains an adsorption member 3 for the adsorption of hydrocarbons (see FIG. 2) and a catalyst device 2 which is located downstream of the adsorption device 1 and which contains a catalyst member for the exhaust gas cleaning. The adsorption member 3 comprises a honeycomb support (made of a cordierite) 4 which has a coating layer 5 of an adsorbent component.

Figure 2:
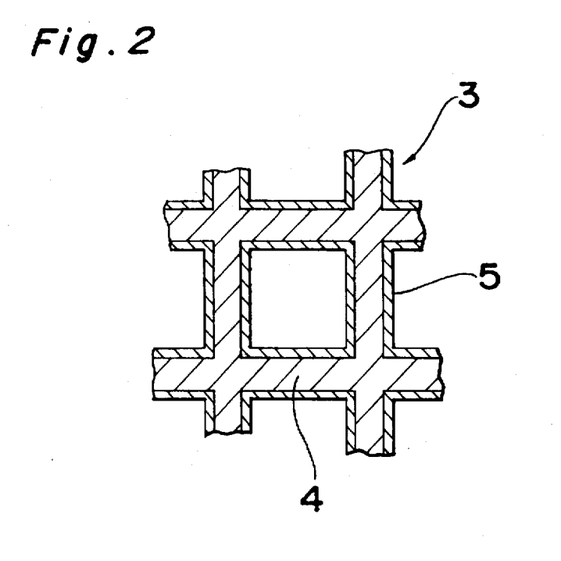
FIG. 2 schematically shows a partially enlarged view of an adsorbent member in the exhaust gas cleaning device according to the present invention.

In the exhaust gas cleaning device, hydrocarbons contained in the exhaust gas are adsorbed by the adsorption device 1 during cold start mode. When an temperature of the exhaust gas is elevated and thus the exhaust gas cleaning catalyst contained in the catalyst device is activated, the hydrocarbons which have been adsorbed in the adsorption device 1 are desorbed and cleaned in the catalyst device 2.

Relationship between structure of adsorbent member or component and adsorption amount The adsorption member of the exhaust gas cleaning device as described above will be described with reference to the following Examples and Comparative Examples.

Example 1

Chabazite (CHA) as the zeolite having the eight membered ring structure, ZSM-5 (MFI type) as the zeolite having the ten membered ring structure and faujasite (FAU) as the zeolite having the twelve membered ring structure were mixed in a weight ratio (CHA:ZSM-5: FAU) of 1:2:3 to prepare an adsorbent mixture component (in the form of power) for hydrocarbons. The mixture component was wash coated on a honeycomb support to have a adsorbent member 3.

Figure 3:
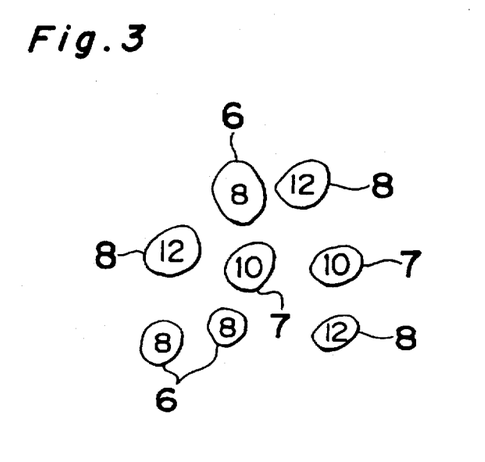
FIG. 3 schematically shows an enlarged adsorbent component produced in Example 1 in an enlarged mode.

The adsorbent member 3 had a coating layer 5 on the surface of the honeycomb support 4 in which three kinds of the zeolite powder each having the different pore diameter to one another (namely, the eight membered ring pore structure, the ten membered ring pore structure and the twelve membered ring pore structure) were present together. Thus, the coating layer would be as shown in FIG. 3 in which the zeolite particle having the eight membered ring structure 6 (indicted with a numeral "8" within a particle profile), the zeolite particle having the ten membered ring structure 7 (indicted with a numeral "10" within a particle profile), and the zeolite particle having the twelve membered ring structure 8 (indicted with a numeral "12" within a particle profile) are mixed together.

Example 2

Figure 4:
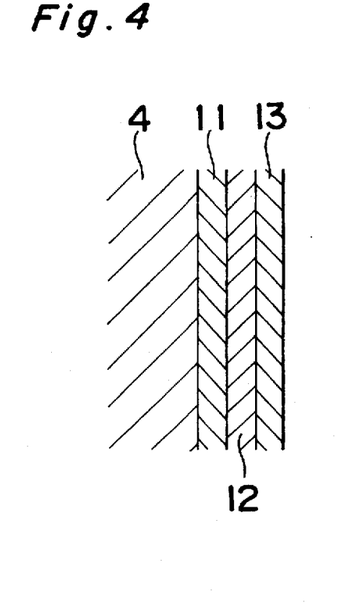
FIG. 4 schematically shows an enlarged cross sectional view of an adsorbent member produced in Example 2 in an enlarged mode.

Chabazite, ZSM-5 and faujasite were successively wash coated in order on a honeycomb support in a weight ratio (CHA:ZSM-5: FAU) of 1:2:3 to produce an adsorbent member 3. The member had a three layer structure adsorbent component in which the zeolite layer 11 having the eight membered ring structure is laminated on the surface of the honeycomb support 4, the zeolite layer 12 having the ten membered ring structure on the zeolite layer 11, and the zeolite layer 13 having the twelve membered ring structure on the zeolite layer 12, as schematically shown in FIG. 4.

Example 3

Figure 5:
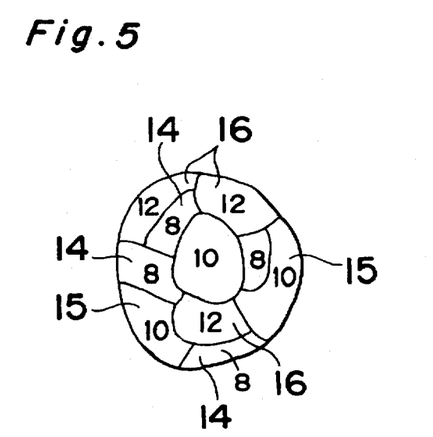
FIG. 5 schematically shows an enlarged adsorbent component produced in Example 3 in an enlarged mode.

A precursor for the synthesis of the zeolite having the eight membered ring structure, a precursor for the synthesis of the zeolite having the ten membered ring structure and a precursor for the synthesis of the zeolite having the twelve membered ring structure were mixed in a weight ratio of 1:2:3, respectively and the mixture was hydrothermally synthesized in an autoclave. The zeolite thus prepared was a crystalline mixture zeolite as an adsorbent component in which a crystalline portion having the eight membered ring structure pore 14 (indicted with a numeral "8" within a crystal profile), a crystalline portion having the ten membered ring structure pore 15 (indicted with a numeral "10" within a crystal profile) and a crystalline portion having the twelve membered ring structure pore 16 (indicted with a numeral "12" within a crystal profile) were present together in a mixed state as schematically shown in FIG. 5. The crystalline mixture zeolite was wash coated on a honeycomb support to produce an absorbent member 3 in which a coating layer 5 made of the crystalline mixture zeolite was formed on the surface of the honeycomb support 4.

Example 4

Figure 6:
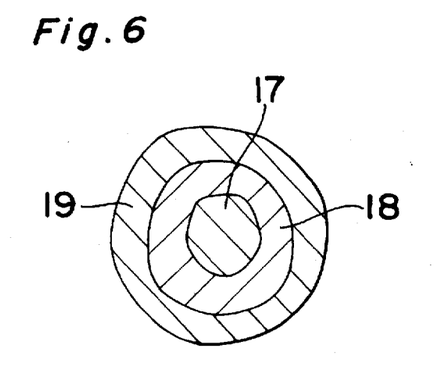
FIG. 6 schematically shows an enlarged cross sectional view of an adsorbent component produced in Example 4 in an enlarged mode.

When a zeolite having the ten membered ring structure pore was prepared from its precursor, a zeolite having the eight membered ring structure pore was mixed with the precursor beforehand. Then, the resulted mixture was hydrothermally synthesized in an autoclave to prepare a crystalline zeolite having the ten membered ring structure pore in which the zeolite having the eight membered ring structure pore was present as a nucleus. The prepared zeolite was used as a nucleus to prepare a zeolite having the twelve membered ring structure pore in the same manner as just described above. The prepared zeolite in the form of a powder particle as an adsorbent component had a layered structure in which the center portion was made of a crystalline (core) portion 17 having the eight membered ring structure pore, a crystalline (inner) portion 18 having the ten membered ring structure pore, and a crystalline (outer) portion 19 having the twelve membered ring structure pore as schematically shown in FIG. 6. The layered crystalline zeolite powder was wash coated on a honeycomb support 4 to produce an adsorbent member 3, in which a coating layer 5 made of the layered crystalline zeolite powder was formed on the surface of the honeycomb support 4.

Comparative Example 1

Chabazite as a zeolite having the eight membered ring pore structure was wash coated on a honeycomb support to produce an adsorbent member 3.

Comparative Example 2

ZSM-5 as a zeolite having the ten membered ring pore structure was wash coated on a honeycomb support to produce an adsorbent member 3.

Comparative Example 3

Faujasite as a zeolite having the twelve membered ring pore structure was wash coated on a honeycomb support to produce an adsorbent member 3.

The adsorbent members produced in the above Examples 1 to 4 and Comparative Examples 1 to 3 were tested under the following conditions and amounts of adsorbed hydrocarbons were measured. The results are shown in Table 2 below.

Test Conditions:

Engine: V6-2500 ml
Measurement Mode: LA4-Y1
Adsorbent member: 1.3 liter full sized honeycomb
(130–180 g-adsorbent component)

An exhaust gas from the automobile engine during the Y1 mode had the following hydrocarbon composition:

| (1) Aromatics including toluene | about 41% |
| (2) $C_6$ + hydrocarbons excluding aromatics | about 23% |
| (3) $C_2$–$C_5$ olefins | about 12% |
| (4) $C_2$–$C_5$ paraffins | about 12% |
| (5) Others | about 12% |

TABLE 2

| Adsor. | Adsorbed HC (hydrocarbon) (mg-HC/g-cat.) | | | | | | Total (mg-HC/g-cat.) |
| --- | --- | --- | --- | --- | --- | --- | --- |
| | Methane | $C_2$–$C_5$ paraf. | $C_2$–$C_5$ olefine | $C_6$+ paraf. | $C_6$+ olefine | Aroma. | |
| Exa. 1 | 0.11 | 1.54 | 2.18 | 0.48 | 0.37 | 2.48 | 7.16 |
| Exa. 2 | 0.16 | 1.52 | 2.13 | 0.41 | 0.33 | 2.31 | 6.86 |
| Exa. 3 | 0.18 | 1.63 | 2.33 | 0.46 | 0.44 | 2.53 | 7.57 |
| Exa. 4 | 0.25 | 1.76 | 2.48 | 0.45 | 0.41 | 2.51 | 7.86 |
| Com. 1 | 0.21 | 1.51 | 2.12 | 0.11 | 0.09 | 0.09 | 4.13 |
| Com. 2 | 0.13 | 1.53 | 2.15 | 0.40 | 0.33 | 2.13 | 6.67 |
| Com. 3 | 0.05 | 1.32 | 1.98 | 0.45 | 0.39 | 2.50 | 6.69 |

Legend
Adsorb.: Adsorbent, Paraf.: Paraffins, Aroma: Aromatics
Exa.: Example, Com.: Comparative Example Considering the above results, the amount of the adsorbed small hydrocarbon (such as methane) is large, while the amount of the adsorbed large hydrocarbon (such as $C_6$+ hydrocarbons) is extremely small in Comparative Example 1. To the contrary, the large hydrocarbon (such as $C_6$+ hydrocarbons) is adsorbed, but the amount of the adsorbed small hydrocarbon (such as $C_5$– hydrocarbons) is small in Comparative Example 3. In Comparative Example 2, the results are in-between of those of Comparative Example 1 and Comparative Example 3.

In Example 1, an amount of adsorbed methane is smaller than that of Comparative Example 1 or 2. However, an amount of the adsorbed $C_2$+ hydrocarbon is larger than in Comparative Example 1 or 2.

When compared with Comparative Example 3, Example 1 is similar in an amount of the adsorbed $C_6$+ hydrocarbons, but superior in an amount of the adsorbed $C_5$– hydrocarbons. As to the total adsorbed amount, Example 1 is superior to Comparative Examples 1, 2 and 3. This is because that three kinds of the zeolite particles each having the different pore diameter (i.e. the zeolite particle 6 having the eight membered ring structure pore, the zeolite particle 7 having the ten membered ring structure pore, and the zeolite particle 8 having the twelve membered ring structure pore) are present together in the mixed state as shown in FIG. 3 so that the hydrocarbons are selectively adsorbed by the zeolite particles each having the suitable pore for each hydrocarbon.

In Example 2, an amount of adsorbed methane is larger than in Example 1, but an amount of the adsorbed $C_2$+ hydrocarbons is smaller than in Example 1 and similar to that of Comparative Example 2. As to the total amount of the adsorbed hydrocarbons, Example 2 is superior to Comparative Examples 1, 2 and 3. The reason why the total adsorbed amount in Example 2 is inferior to Example 1 seems to be that Example 2 is not so advantageous as in Example 1 in that the various kinds of the zeolite powders each having the different pore diameter are present very closely. Since methane is a small size hydrocarbon, it easily diffuses into the inner layer so that Example 2 is superior to Example 1 in the amount of the adsorbed methane.

In Example 3, amounts of the adsorbed hydrocarbons are larger than those in Examples 1 and 2 with some exceptions. This is because the zeolite particle of Example 3 is of a mixed crystalline as shown in FIG. 5 so that it is more ideal in the close arrangement of the zeolite crystals each having the different pore diameter. Further, when a smaller size hydrocarbon is contacted with a zeolite particle, it diffuses through a pore even though the pore is relatively larger, and it finally meets with a crystalline portion which has a fittable pore (in its size or shape) for the hydrocarbon and it is trapped there. Example 3 is superior to all Comparative Examples in all measurement items except that an amount of the adsorbed methane in Comparative Example 1 is slightly large.

In Example 4, all measurement items are much better than those of Comparative Examples. Compared with Example 3, an amount of the adsorbed $C_5-$ hydrocarbon of Example 4 is much larger while an amount of $C_6$+ hydrocarbon is smaller, which means that Example 4 is more effective to the hydrocarbons having a smaller size. This is because that the adsorbent component of Example 4 is layered crystal as shown in FIG. 6 in which the crystalline potions each having the different pore diameter are of the layered structure, so that the smaller size hydrocarbons adsorbed in the center crystalline portion 17 is not able to go out since the larger hydrocarbons adsorbed in the outer crystalline portions 18 and 19 plug the pores, whereby the desorption of the smaller size hydrocarbon is suppressed.

In the following Examples 5 to 10, ZSM-5 (MFI type) was used as the zeolite having the ten membered ring structure pore and zeolite Y (FAU type) was used as the zeolite having the twelve membered ring structure pore in order to observe an effect of a mixing ratio of these two zeolite on an amount of adsorbed hydrocarbons.

Example 5

An adsorbent component consisting essentially of ZSM-5 and zeolite Y which were mixed in the following ratio was wash coated on a honeycomb support to produce an adsorbent member 3.

MFI:FAU=3:1

Example 6

Example 5 was repeated to produce the adsorbent member except that the mixing ratio was as follows:

MFI:FAU=2.5:1

Example 7

Example 5 was repeated to produce the adsorbent member except that the mixing ratio was as follows:

MFI:FAU=2:1

Example 8

Example 5 was repeated to produce the adsorbent member except that the mixing ratio was as follows:

MFI:FAU=1:1

Example 9

Example 5 was repeated to produce the adsorbent member except that the mixing ratio was as follows:

MFI:FAU=1:2

Example 10

Example 5 was repeated to produce the adsorbent member except that the mixing ratio was as follows:

MFI:FAU=1:3

Figure 7:
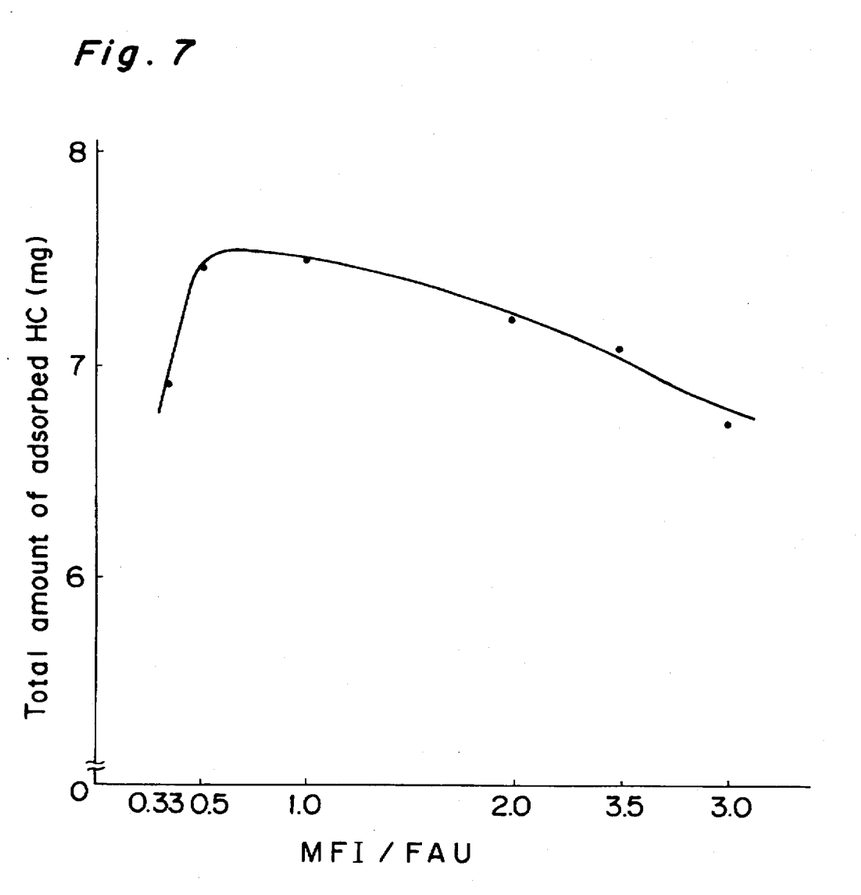
FIG. 7 shows a graph which shows a relationship between an MFI/FAU ratio and an adsorbed amount of hydrocarbons.

The same tests were carried out as in the Examples 1 to 4 and the Comparative Examples 1 to 3 as to the adsorbent members produced in the above Examples 5 to 10 and the results were obtained as shown in Table 3 below and a graph in FIG. 7:

TABLE 3

| Adsor. | Adsorbed HC (hydrocarbon) (mg-HC/g-cat.) | | | | | | Total (mg-HC/g-cat.) |
|---|---|---|---|---|---|---|---|
| | Methane | $C_2$-$C_5$ paraf. | $C_2$-$C_5$ olefine | $C_6$+ paraf. | $C_6$+ olefine | Aroma. | |
| Exa. 5 | 0.08 | 1.50 | 2.08 | 0.52 | 0.41 | 2.19 | 6.78 |
| Exa. 6 | 0.08 | 1.55 | 2.25 | 0.45 | 0.43 | 2.36 | 7.12 |
| Exa. 7 | 0.09 | 1.54 | 2.27 | 0.49 | 0.44 | 2.43 | 7.26 |
| Exa. 8 | 0.07 | 1.75 | 2.26 | 0.52 | 0.43 | 2.51 | 7.54 |
| Exa. 9 | 0.05 | 1.63 | 2.21 | 0.55 | 0.48 | 2.57 | 7.49 |
| Exa. 10 | 0.04 | 1.32 | 2.15 | 0.48 | 0.42 | 2.51 | 6.92 |

Legend
Adsorb.: Adsorbent, Paraf.: Paraffins, Aroma: Aromatics
Exa.: Example, Com.: Comparative Example According to Table 3 and the graph in FIG. 7, it is seen that the total adsorbed amount is not less than 7 mg/g-adsorbent at a ratio (MFI/FAU) in a range of 0.4 to 2.6, which is a preferable range.

The adsorbent component prepared in Example 8 was used in the following Examples 11 to 13, to which a catalytic metal was deposited to produce an exhaust gas cleaning catalyst and its hydrocarbon cleaning ratio was measured.

Example 11

The adsorbent component of Example 8 was wash coated on a honeycomb support and calcined at a temperature of 500° C. for 2 hours. Then, the support was impregnated with a cerium nitrate ($Ce(NO_3)_3 \cdot H_2O$) aqueous solution followed by calcination at a temperature of 500° C. for one hour. Then, the support was impregnated with a palladium nitrate ($Pd(NO_3)_2$) aqueous solution followed by calcination at a temperature of 500° C. for one hour to produce an exhaust gas cleaning catalyst member of an impregnation type.

Example 12

The adsorbent component of Example 8 was wash coated on a honeycomb support and calcined at a temperature of 500° C. for 2 hours. Then, cerium oxide powder carrying Pd (Pd/CeO$_2$) which had been deposited with the evaporation to dryness method beforehand was wash coated on the support followed by calcination at a temperature of 500° C. for one hour to produce an exhaust gas cleaning catalyst member of a laminate type.

Example 13

The adsorbent component of Example 8 and Pd carrying cerium oxide powder (Pd/CeO$_2$) were mixed, wash coated on a honeycomb support and then calcined at a temperature of 500° C. for two hours to produce an exhaust gas cleaning catalyst member of a mixture type.

The catalyst member produced in each of Examples 11 to 13 was incorporated in an exhaust gas line from an engine of an actual automobile, and a three way catalyst member was also incorporated upstream of said catalyst member so as to practically estimate said catalyst member in the LA4-Y1 mode. The results are shown in Table 4. The Y1 cleaning ratio in Table 4 is a total cleaning ratio (decomposition ratio) with the three way catalyst member and the catalyst member of the present Example. Further, Y1 cleaning ratio with only the three way catalyst member is also shown in Table 3.

TABLE 4

|  | HC adsorption ratio (%) (0 to 60 seconds) | Y1 cleaning ratio (%) (0 to 505 seconds) |
|---|---|---|
| Example 11 | 74 | 65 |
| Example 12 | 71 | 61 |
| Example 13 | 69 | 62 |
| Three way catalyst only | — | 47 |

According to Table 4, Y1 cleaning ratio of every Example is higher than three component catalyst only case by about 15%, and the hydrocarbon adsorbed in the adsorbent component is decomposed by cooperation of the O$_2$ storage effect of cerium and the catalytic function of Pd. In this case, even though oxygen contained in the exhaust gas is consumed, the decomposition of the hydrocarbon with Pd occurs because of the O$_2$ storage effect of cerium.

Relationship between HC adsorbent and NOx cleaning

An HC adsorbent component suitable for NOx cleaning was prepared and a catalytic metal was supported on the absorbent component, and then NOx cleaning ratio of the absorbent component was observed.

Example 14

Production of HC absorbent component

Using the following three solutions and ultra-stable zeolite Y (SiO$_2$/Al$_2$O$_3$ ratio: 80), a composite zeolite consisting essentially of a FAU type crystalline portion and a MFI type crystalline portion was prepared.

S-1 solution: aluminum sulfate 3.5 g, sulfuric acid 6.2 g, and water 60 ml

S-2 solution: No. 3 water glass 69 g and water 45 ml

S-3 solution: sodium chloride 26.3 g, TPAB 7.5 g, sulfuric acid 2.85 g and sodium hydroxide 2.4 g S-3 solution was stirred with a disperser at 6000 rpm, to which 10 g of an ultra-stable zeolite Y (USY) was added as the FAU type zeolite. Further, S-1 solution and S-2 solution were added together to the resulted solution at 10 ml/min. and 15 ml/min., respectively. After the addition, the stirring was continued for another two minutes to produce a precursor with keeping a pH value of the solution of 8.7.

The resulted precursor was charged into an autoclave and nitrogen was filled in a cylinder of the autoclave to an internal pressure of 4 kg/cm$^2$. With stirring at 180 rpm, the precursor was hydrothermally synthesized by heating to a temperature of 160° C. in 160 minutes, and further to a temperature of 200° C. in 600 minutes. The resulted product was washed with a large amount of pure water, then dried at 150° C. and further calcined at a temperature of 550° C. for two hours for the removal of TPAB (i.e. tetrapropylammonium bromide, (C$_3$H$_7$)$_4$NBr) to produce Na type composite zeolite.

Figure 8:
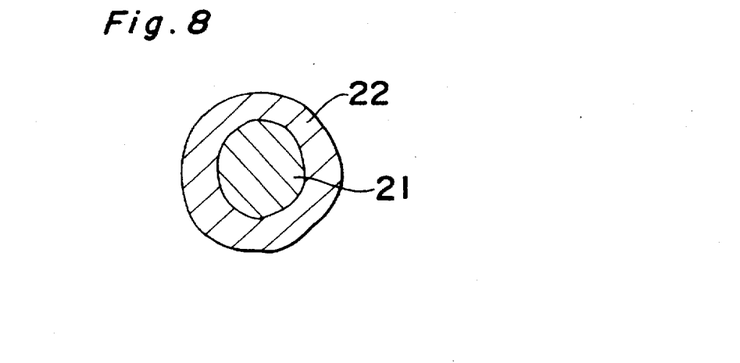
FIG. 8 schematically shows an enlarged cross sectional view of an adsorbent component produced in Example 13.

Ammonium nitrate in an amount of 10 equivalents to Al contained in the Na type composite zeolite was dissolved in 500 ml of pure water, to which the Na type composite zeolite was added and then stirred for 2.5 hours at room temperature so as to ion-exchange Na$^+$ with H$^+$. The resulted product was washed, dried and then calcined at a temperature of 500° C. for 2 hours to produce H type MFI-FAU composite zeolite as an HF adsorbent component. The adsorbent component had a structure as shown in FIG. 8 in which a core portion was made of FAU crystalline portion 21 having the twelve membered ring structure with the large pore and an surface region was made of MFI crystalline portion 22 having the ten membered ring structure with the small pore.

Preparation of catalyst powder and test member

To the resulted H type MFI-FAU composite zeolite, Pt and Rh were supported at a ratio (Pt:Rh) of 75:1 by using platinum chloride acid and rhodium nitrate and ion-exchanged water as a solvent through the evaporation to dryness method. The resulted powder was heated at a temperature of about 300° C. for a predetermined period to produce NOx cleaning catalyst powder (Pt-Rh/MFI-FAU).

Using the catalyst powder and an alumina binder, a slurry was prepared, which was wash coated on a honeycomb support (400 cells/inch$^2$) made of a cordierite to produce the Example test member.

Preparation of Comparative test member

The same procedures as just described above was repeated except that the MFI type zeolite (ZSM-5) was used in place of the composite zeolite to produce catalyst powder (Pt-Rh/MFI) carrying the same amount of Pt and Rh as in the above. The resulted powder was coated on the same honeycomb support to have a Comparative test member.

Estimation of NOx cleaning property

The Example test member and the Comparative test member each was set in a simulated gas estimation equipment, and estimated with respect to a NOx cleaning property using a test gases. The test gas comprised butane or propylene as a hydrocarbon. The NOx cleaning ratio was measured at some temperatures during a temperature increase test in which the test gas was flowed through the test member so as to adsorb the hydrocarbon to the catalyst powder and then a test gas comprising no hydrocarbon was supplied while an atmosphere temperature around the member was heated from an ambient temperature to 350° C., or during a temperature decrease test in which, after the temperature reached 350° C., it was decreased to the ambient temperature. The measurement was carried out as to butane and propylene. The results are shown in FIGS. 9 to 12.

Figure 9:
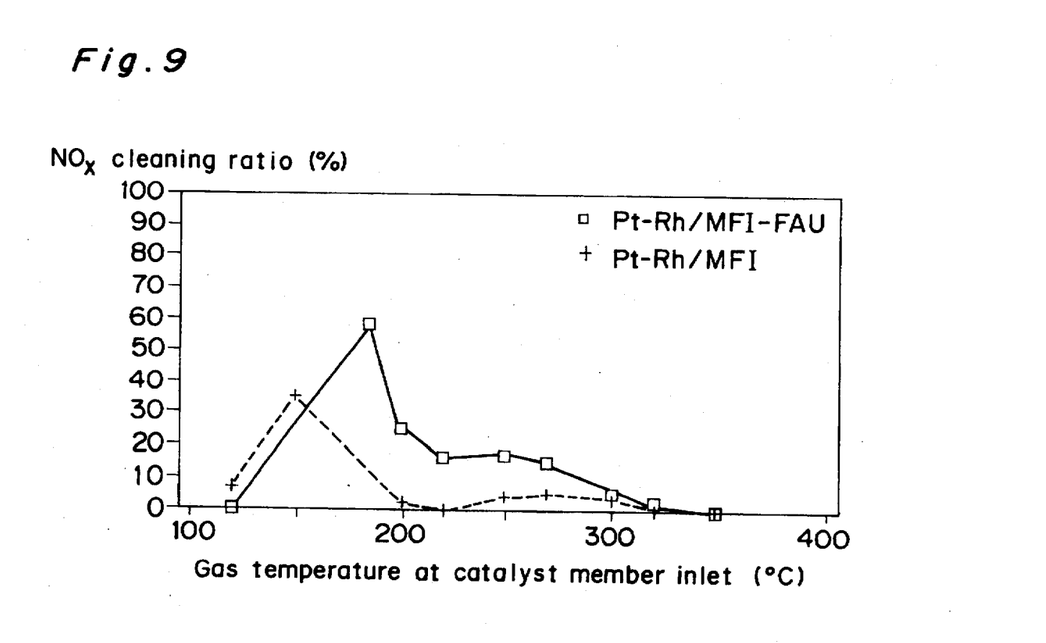
FIG. 9 shows a graph indicating data of a NOx cleaning ratio of a temperature increasing test with respect to Example 13 and Comparative Example members when butane is used as a hydrocarbon.

FIG. 9 shows the results in the case in which butane was used as the hydrocarbon. Pt-Rh/MFI-FAU showed a peak NOx cleaning ratio at 180° C. and Pt-Rh/MFI showed the peak NOx cleaning ratio at 150° C. (and a datum of Pt-Rh/MFI-FAU at 150° C. and a datum of Pt-Rh/MFI at 180° C. are excluded from FIG. 9 since other temperature showed the peak NOx cleaning ratio). At a gas temperature at an inlet of the catalytic member above 150° C., the test member of the present invention showed a much higher NOx cleaning ratio. This is because butane having small reactivity was adsorbed in the FAU type crystalline portion 21 and cracked into smaller hydrocarbons there, which contributes to the NOx decomposition. Such a NOx decomposition mechanism is such that Pt of the catalytic metals mainly decomposes NOx using a reactive hydrocarbon as a reducing agent.

The Example test member showed a relatively high NOx cleaning ratio also at a high temperature. This seems to be because butane adsorbed in the MFI type crystalline portion in the surface region plugs the pores of the FAU crystalline portion in the center portion so that butane adsorbed in the FAU crystalline portion 21 is not able to go out of the FAU crystalline portion and kept adsorbed there even at an elevated temperature. To the contrary, the Comparative test member adsorbs butane mainly in the surface region an adsorbed amount of which is small since the adsorbent component is entirely made of the MFI type crystal. However, in the Example test member, butane adsorbed in the surface region can further diffuses inside of the particle since the inside is made of the FAU crystalline portion 21 having the larger pore diameter. Thus, the adsorbed amount in the Example test member is large and the above plugging effect seems to be achieved.

Figure 10:
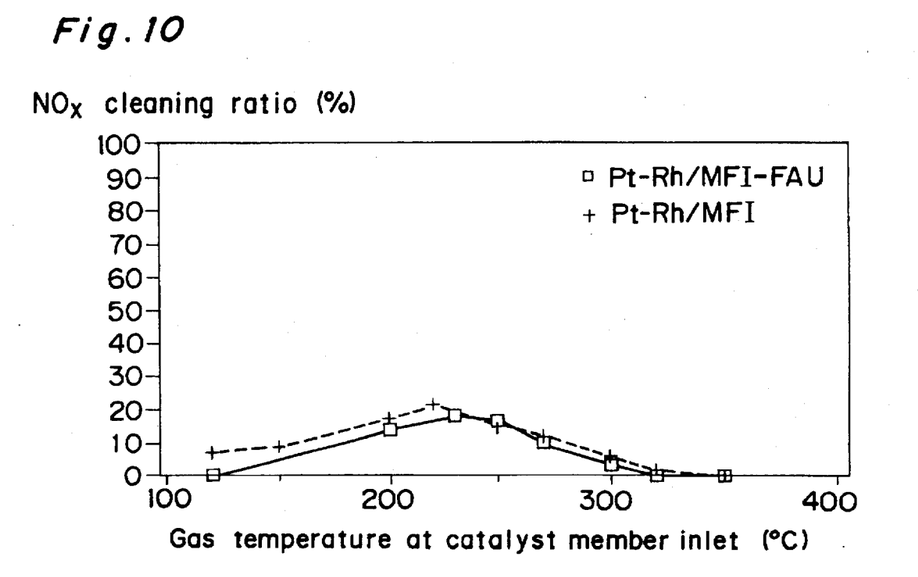
FIG. 10 shows a graph indicating data of a NOx cleaning ratio of a temperature decreasing test with respect to Example 13 and Comparative Example members when butane is used as a hydrocarbon.

FIG. 10 shows the result of the temperature decreasing test with butane as the hydrocarbon. In this test, there is not so large difference between the Example test member and the Comparative test member. This is because the catalyst temperature was once increased so that most of the adsorbed butane was desorbed. According to FIG. 10, the NOx decomposition occurred in spite of the absence of the hydrocarbon. This is because NOx decomposition occurred using CO contained in the test gas as a reducing agent.

Figure 11:
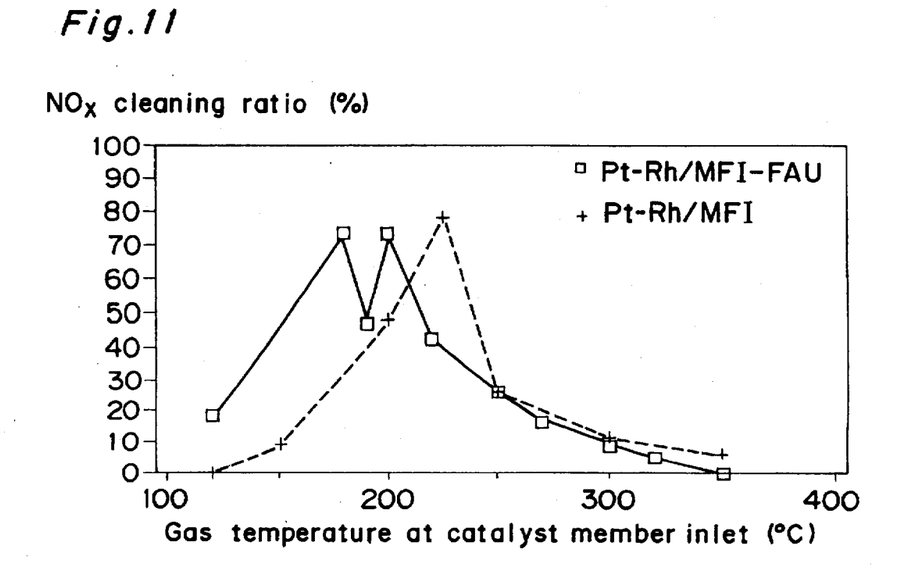
FIG. 11 shows a graph indicating data of a NOx cleaning ratio of a temperature increasing test with respect to Example 13 and Comparative Example members when propylene is used as a hydrocarbon.

FIG. 11 shows the result of the temperature increasing test with propylene as the hydrocarbon. The Example test member showed a high NOx cleaning ratio at a lower temperature. This seems to be because adsorption with Pt-Rh/MFI-FAU made propylene more reactive. The Comparative test member showed a better ratio at a higher temperature. Overall estimation of the NOx cleaning ratio results in that the Example test member is better than the Comparative test member. Why there is not so large difference between the Example and the Comparative test members is the high reactivity inherent in propylene.

Anyway, the reason why the Example test member showed the reduced ratio once at about 180° C. is as follows:

The catalyst temperature was rapidly increased by the reaction heat with progress of the catalytic reaction, so that the NOx cleaning ratio was rapidly increased when the temperature exceeded 100° C. However, at such a time, the test gas temperature was still of a lower temperature, which cooled the catalyst to suppresses the catalytic reaction so that the NOx cleaning ratio at 180° C. was decreased. Thereafter, the temperature increase of the test gas increases the cleaning ratio.

Figure 12:
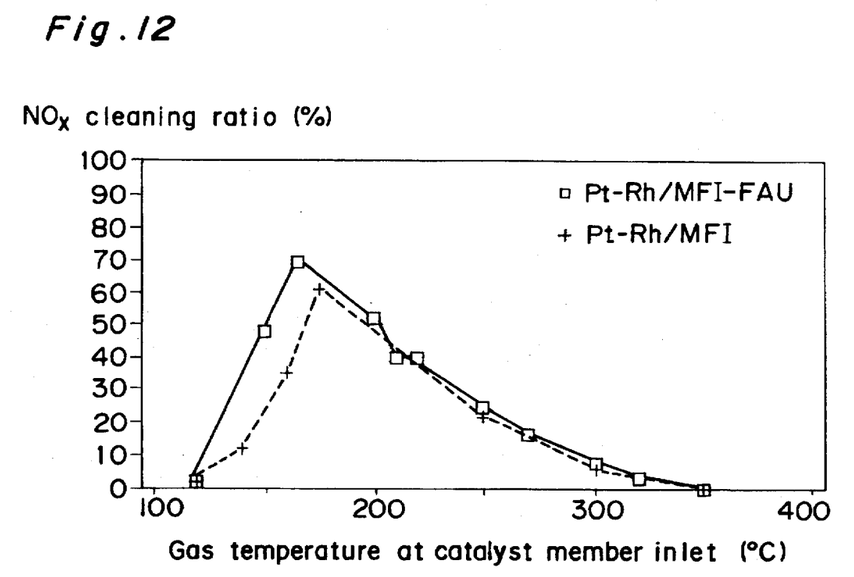
FIG. 12 shows a graph indicating data of a NOx cleaning ratio of a temperature decreasing test with respect to Example 13 and Comparative Example members when propylene is used as a hydrocarbon.

FIG. 12 shows the results of the temperature decreasing test with propylene. There is not so large difference between the Example and the Comparative test members.

What is claimed is:

1. An adsorbent component in the form of layered silicate powder for the absorption of a hydrocarbon comprising a plurality of particles with each of said particles having at least two metal containing crystalline silicate layers wherein each layer has a different pore diameter and an outer silicate layer has a larger pore diameter relative to an inner silicate layer.

2. The adsorbent component according to claim 1 wherein each different pore diameter is based on an eight membered ring structure, a ten membered ring structure, or a twelve membered ring structure.

3. An exhaust gas cleaning device comprising (i) an adsorbent member which adsorbs a hydrocarbon contained in an exhaust gas and (ii) a catalytic metal for decomposing a hydrocarbon; wherein the adsorbent member comprises a support member on which a plurality of zeolites each having a different pore diameter to one another are coated, said zeolites including zeolites based on an eight membered ring structure, zeolites based on a ten membered ring structure and zeolites based on a twelve membered ring structure, which zeolites are arranged such that the zeolite based on an eight membered ring structure is located inside relative to the zeolite based on a ten membered ring structure which is located inside relative to the zeolite based on a twelve membered ring structure.

4. The exhaust gas cleaning device according to claim 3 wherein the support member further carries ceria and/or Pd.

5. An exhaust gas cleaning device comprising (i) an adsorbent member which adsorbs a hydrocarbon contained in an exhaust gas and (ii) a catalytic metal for decomposing a hydrocarbon; wherein the absorbent member comprises a support member coated with a zeolite particle powder and further wherein the powder comprises a plurality of particles with each of said particles having a plurality of crystalline zeolite portions with each portion having a different pore diameter.

6. The gas cleaning device according to claim 5 wherein each different pore diameter is based on an eight membered ring structure, a ten membered ring structure, or a twelve membered ring structure.

7. The exhaust gas cleaning device according to claim 6 wherein the support member further carries ceria and/or Pd.

8. The device according to claim 5 wherein the catalytic metal is located downstream of the absorbent member relative to flow through the device.

9. An exhaust gas cleaning device comprising (i) an adsorbent member which adsorbs a hydrocarbon contained in an exhaust gas and (ii) a catalytic metal for decomposing a hydrocarbon; wherein the absorbent member comprises a support member coated with crystalline zeolite particle powder and further wherein the powder comprises a plurality of particles with each of said particles containing a plurality of the crystalline portions each of said portions having a different pore diameter such that a crystalline portion having a larger pore is located on an outer side of said particle relative to a crystalline portion having a smaller pore.

10. The exhaust gas cleaning device according to claim 9 wherein each different pore diameter is based on an eight membered ring structure, a ten membered ring structure, or a twelve membered ring structure.

11. The exhaust gas cleaning device according to claim 10 wherein the support member further carries ceria and/or Pd.

12. The device according to claim 9 wherein the catalytic metal is located downstream of the absorbent member relative to flow through the device.

13. An adsorbent component in the form of a layered silicate particle power for the adsorption of a hydrocarbon contained in an exhaust gas comprising a plurality of particles, with each of said particles having at least two metal containing crystalline silicate portions which are laminated such that an outer portion has a smaller pore diameter than in an inner portion with respect to a direction from a center toward an outer surface of a particle.

14. The adsorbent component according to claim 13 wherein the layered silicate particle comprises a crystal portion comprising a ten membered ring structure in its surface region and a crystal portion comprising a twelve membered ring structure in its inside region.

15. The adsorbent component according to claim 14 characterized in that the crystal portion having the ten membered ring structure is an MFI structure and the crystal having the twelve membered ring structure is an FAU structure.

16. An exhaust gas cleaning catalyst comprising an adsorbent component comprising a layered silicate particle powder for the absorption of a hydrocarbon contained in an exhaust gas, said powder comprising a plurality of particles with each of said particles having at least two metal containing crystalline silicate portions which are laminated such that an outer portion has a smaller pore diameter than in an inner portion with respect to a direction from a center toward an outer surface of a particle, and the component carries a catalytic metal which decomposes hydrocarbons.

17. The exhaust gas cleaning catalyst according to claim 16 wherein the catalytic metal decomposes NOx contained in exhaust gas while hydrocarbon is decomposed.

* * * * *